US011191114B2

(12) United States Patent
Hua et al.

(10) Patent No.: US 11,191,114 B2
(45) Date of Patent: Nov. 30, 2021

(54) METHOD, APPARATUS AND SYSTEM FOR OBTAINING DEVICE-TO-DEVICE COMMUNICATION RESOURCE

(71) Applicant: HUAWEI TECHNOLOGIES CO., LTD., Guangdong (CN)

(72) Inventors: Yao Hua, Shenzhen (CN); Mingchao Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/891,980

(22) Filed: Feb. 8, 2018

(65) Prior Publication Data
US 2018/0167990 A1 Jun. 14, 2018

Related U.S. Application Data

(63) Continuation of application No. PCT/CN2016/085851, filed on Jun. 15, 2016.

(30) Foreign Application Priority Data

Aug. 13, 2015 (CN) .......................... 201510497692.X

(51) Int. Cl.
H04W 76/14 (2018.01)
H04W 72/04 (2009.01)
(Continued)

(52) U.S. Cl.
CPC ........... *H04W 76/14* (2018.02); *H04W 8/005* (2013.01); *H04W 72/04* (2013.01);
(Continued)

(58) Field of Classification Search
CPC . H04W 76/14; H04W 8/005; H04W 72/0406; H04W 72/04; H04W 88/02; H04W 92/18
See application file for complete search history.

(56) References Cited

U.S. PATENT DOCUMENTS 10,531,503 B2\* 1/2020 Jung ..................... H04W 76/27
2012/0106517 A1 5/2012 Charbit et al.
(Continued)

FOREIGN PATENT DOCUMENTS

CN 102334370 A 1/2012
CN 103634852 A 3/2014
(Continued)

OTHER PUBLICATIONS

International Search Report dated Aug. 26, 2016 in corresponding International Patent Application No. PCT/CN2016/085851.
(Continued)

Primary Examiner — Ian N Moore
Assistant Examiner — Rushil Parimal Sampat
(74) Attorney, Agent, or Firm — Slater Matsil, LLP

(57) ABSTRACT

A D2D communication method includes: determining, by a base station in a first network, that a D2D communication timeslot in the first network needs to be configured, where the D2D communication timeslot is used for D2D communication between a first terminal in the first network and a second terminal in a second network, and the first network and the second network are different home networks; sending, by the base station, a resource request to a third terminal in the first network, where the resource request is used to instruct the third terminal to report, to the base station, information used to configure the D2D communication timeslot; and receiving, by the base station, a resource request response sent by the third terminal, where the resource request response includes the information used to configure the D2D communication timeslot and obtained by the third terminal from the second network.

8 Claims, 4 Drawing Sheets

(51) Int. Cl.
  *H04W 8/00* (2009.01)
  *H04W 92/18* (2009.01)
  *H04W 88/02* (2009.01)
(52) U.S. Cl.
  CPC ........ *H04W 72/0406* (2013.01); *H04W 88/02* (2013.01); *H04W 92/18* (2013.01)

(56) References Cited

U.S. PATENT DOCUMENTS

| | | |
|---|---|---|
| 2013/0150051 A1 | 6/2013 | Van Phan et al. |
| 2014/0130137 A1 | 5/2014 | Baek et al. |
| 2014/0185530 A1 | 7/2014 | Kuchibhotla et al. |
| 2015/0043448 A1* | 2/2015 | Chatterjee ............. H04W 8/005 370/329 |
| 2015/0146687 A1 | 5/2015 | Kim et al. |
| 2015/0163770 A1 | 6/2015 | Guo et al. |
| 2015/0223204 A1 | 8/2015 | Cao et al. |
| 2015/0341878 A1 | 11/2015 | Lee et al. |
| 2016/0278121 A1* | 9/2016 | Agiwal ................. H04W 8/005 |
| 2017/0034825 A1 | 2/2017 | Harada et al. |
| 2017/0150409 A1* | 5/2017 | Gao ................. H04W 36/0083 |
| 2017/0202042 A1* | 7/2017 | Gao ..................... H04W 76/14 |
| 2020/0280977 A1* | 9/2020 | Chen ..................... H04W 76/11 |

FOREIGN PATENT DOCUMENTS

| | | |
|---|---|---|
| CN | 104320851 A | 1/2015 |
| CN | 104812089 A | 7/2015 |
| JP | 2015126393 A | 7/2015 |
| KR | 1020150002650 A | 1/2015 |
| KR | 20150024333 A | 3/2015 |
| RU | 2540892 C1 | 2/2015 |
| WO | 2011147462 A1 | 12/2011 |
| WO | 2013172755 A1 | 11/2013 |

OTHER PUBLICATIONS

Notice of Reasons for Rejection, dated Jan. 8, 2019, in Japanese Application No. 2018506943 (6 pp.).
"3$^{rd}$ Generation Partnership Project; Technical specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.0.0, Jun. 2015, 254 pgs.
"3$^{rd}$ Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V12.6.0, Jun. 2015, 449 pgs.
International Search Report dated Aug. 26, 2016, in corresponding International Patent Application No. PCT/CN2016/085851, 4 pgs.
Extended European Search Report, dated Jun. 20, 2018, in European Application No. 16834514.8 (7 pp.).
Decision on Grant of a Patent for Invention, dated Dec. 11, 2018, in Russian Application No. 2018107333 (22 pp.).
Notice of Preliminary Rejection, dated Feb. 14, 2019, in Korean Application No. 1020187006023 (9 pp.).
Chinese Office Action dated Mar. 15, 2019 in corresponding Chinese Patent Application No. 201510497692.X (5 pages).

* cited by examiner

METHOD, APPARATUS AND SYSTEM FOR OBTAINING DEVICE-TO-DEVICE COMMUNICATION RESOURCE

CROSS-REFERENCE TO RELATED APPLICATIONS

This application is a continuation of International Application No. PCT/CN2016/085851, filed on Jun. 15, 2016, which claims priority to Chinese Patent Application No. 201510497692.X, filed on Aug. 13, 2015. The disclosures of the aforementioned applications are hereby incorporated by reference in their entireties.

TECHNICAL FIELD

The present application relates to wireless communications technologies, and in particular, to a device-to-device (D2D) communication method, an apparatus, and a system.

BACKGROUND

D2D communication (or may be referred to as terminal-to-terminal communication) is a technology that implements direct communication between devices. The Internet of Vehicles that uses the D2D communication technology is used as an example. Information related to vehicle safety needs to be transmitted between geographically proximate vehicles in the Internet of Vehicles. Therefore, regardless of whether a vehicle and another vehicle traveling around the vehicle belong to a same carrier network, information needs to be transmitted between the two vehicles, so as to ensure vehicle safety.

When two terminals that need to perform D2D communication belong to different carrier home networks, for example, a carrier network A and a carrier network B, the carrier network A needs to obtain resource location information used for the D2D communication in the carrier network B, so as to configure a timeslot used for the D2D communication with the carrier network B.

In the prior art, each time after obtaining a resource used to send information to a terminal in the carrier network B, each terminal that belongs to the carrier network A proactively reports, to the carrier network A, resource location information used for D2D communication in the carrier network B. This causes unnecessary signaling overheads.

SUMMARY

The present application provides a D2D communication method, an apparatus, and a system, so that signaling overheads in D2D communication can be significantly reduced.

A first aspect of embodiments of the present application provides a D2D communication method, and the method includes: determining, by a base station in a first network, that a D2D communication timeslot in the first network needs to be configured, where the D2D communication timeslot is used for D2D communication between a first terminal in the first network and a second terminal in a second network, and the first network and the second network are different home networks; sending, by the base station, a resource request to a third terminal in the first network, where the resource request is used to instruct the third terminal to report, to the base station, information used to configure the D2D communication timeslot; and receiving, by the base station, a resource request response sent by the third terminal, where the resource request response includes the information used to configure the D2D communication timeslot and obtained by the third terminal from the second network.

A second aspect of the embodiments of the present application provides a D2D communication method, and the method includes: receiving, by a third terminal in a first network, a resource request sent by a base station in the first network, where the resource request is used to instruct the third terminal to report, to the base station, information used to configure a D2D communication timeslot, the D2D communication timeslot is used for D2D communication between a first terminal in the first network and a second terminal in a second network, and the first network and the second network are different home networks; obtaining, by the third terminal from the second network according to the resource request, the information used to configure the D2D communication timeslot; and sending, by the third terminal, a resource request response to the base station, where the resource request response includes the information used to configure the D2D communication timeslot and obtained by the third terminal from the second network.

According to the technical solution provided in this embodiment of the present application, when determining that a timeslot needs to be configured for D2D communication between a terminal in a local network and a terminal in another network, a base station is triggered to send a resource request to a specific terminal to obtain information used to configure the timeslot in the local network. The local network and the another network are different home networks. Compared with the prior art, the technical solution provided in this embodiment of the present application significantly reduces signaling overheads caused because a terminal frequently reports information related to the another network.

In an implementation of the first aspect or the second aspect of the embodiments of the present application, the resource request includes an information obtaining timeslot, and the information obtaining timeslot is used by the third terminal to obtain, from the second network, the information used to configure the D2D communication timeslot.

In an implementation of the first aspect or the second aspect of the embodiments of the present application, after the receiving, by the base station, a resource request response sent by the third terminal, the method further includes: configuring, by the base station for the first terminal according to the information used to configure the D2D communication timeslot and included in the resource request response, the D2D communication timeslot used for the D2D communication with the second terminal.

In an implementation of the first aspect or the second aspect of the embodiments of the present application, the information used to configure the D2D communication timeslot includes a resource pool time domain location of the second network, or time domain calibration information, or a resource pool time domain location of the second network and time domain calibration information.

In an implementation of the first aspect or the second aspect of the embodiments of the present application, the base station sets a timer, and when the timer expires, the base station determines that the D2D communication timeslot in the first network needs to be configured.

In an implementation of the first aspect or the second aspect of the embodiments of the present application, after the base station receives the resource request response sent by the third terminal, the base station resets the timer.

In an implementation of the first aspect or the second aspect of the embodiments of the present application, the base station receives a notification from the second network, and the notification is used to instruct the base station to configure the D2D communication timeslot in the first network. The base station determines, according to the notification from the second network, that the D2D communication timeslot in the first network needs to be configured.

In an implementation of the first aspect or the second aspect of the embodiments of the present application, the notification from the second network includes information indicating that the resource pool time domain location of the second network changes, and the information used to configure the D2D communication timeslot includes the resource pool time domain location of the second network. Alternatively, the notification includes information indicating that the time domain calibration information changes, and the information used to configure the D2D communication timeslot includes the time domain calibration information. Alternatively, the notification includes information indicating that the resource pool time domain location of the second network changes and information indicating that the time domain calibration information changes, and the information used to configure the D2D communication timeslot includes the resource pool time domain location of the second network and the time domain calibration information.

In an implementation of the first aspect or the second aspect of the embodiments of the present application, the information used to configure the D2D communication timeslot includes the resource pool time domain location of the second network, and the resource request includes a bit used to instruct the third terminal to report the resource pool time domain location of the second network. Alternatively, the information used to configure the D2D communication timeslot includes the time domain calibration information, and the resource request includes a bit used to instruct the third terminal to report the time domain calibration information. Alternatively, the information used to configure the D2D communication timeslot includes the resource pool time domain location of the second network and the time domain calibration information, and the resource request includes a bit used to instruct the third terminal to report the resource pool time domain location of the second network and a bit used to instruct the third terminal to report the time domain calibration information.

In an implementation of the first aspect or the second aspect of the embodiments of the present application, the time domain calibration information is standard time information of a subframe of the second network, or a subframe offset of the second network relative to the first network.

In an implementation of the first aspect or the second aspect of the embodiments of the present application, the third terminal and the first terminal are a same terminal.

A third aspect of the embodiments of the present application provides a base station in a first network, and the base station includes: a processing unit, configured to determine that a D2D communication timeslot in the first network needs to be configured, where the D2D communication timeslot is used for D2D communication between a first terminal in the first network and a second terminal in a second network, and the first network and the second network are different home networks; and a transceiver unit, configured to send a resource request to a third terminal in the first network, where the resource request is used to instruct the third terminal to report, to the base station, information used to configure the D2D communication timeslot. The transceiver unit is further configured to receive a resource request response sent by the third terminal, where the resource request response includes the information used to configure the D2D communication timeslot and obtained by the third terminal from the second network.

A fourth aspect of the embodiments of the present application provides a terminal in a first network, and the terminal is a third terminal, belongs to the first network, and includes: a transceiver unit, configured to receive a resource request sent by a base station in the first network, where the resource request is used to instruct the third terminal to report, to the base station, information used to configure a D2D communication timeslot, the D2D communication timeslot is used for D2D communication between a first terminal in the first network and a second terminal in a second network, and the first network and the second network are different home networks; and a processing unit, configured to obtain, from the second network according to the resource request, the information used to configure the D2D communication timeslot. The transceiver unit is further configured to send a resource request response to the base station, where the resource request response includes the information used to configure the D2D communication timeslot and obtained by the processing unit of the third terminal from the second network.

According to the technical solution provided in this embodiment of the present application, when determining that a timeslot needs to be configured for D2D communication between a terminal in a local network and a terminal in another network, a base station is triggered to send a resource request to a specific terminal to obtain information used to configure the timeslot in the local network. The local network and the another network are different home networks. Compared with the prior art, the technical solution provided in this embodiment of the present application significantly reduces signaling overheads caused because a terminal frequently reports information related to the another network.

The base station provided in the third aspect of the embodiments of the present application and the terminal provided in the fourth aspect of the embodiments of the present application can implement the method in any implementation of the first aspect and the second aspect of the embodiments of the present application, and details are not described herein again.

A fifth aspect of the embodiments of the present application further provides a communications system, and the communications system may include the foregoing terminal and the foregoing base station.

A sixth aspect of the embodiments of the present application further provides a computer program, which may be used to enable a computer to execute the method according to any one of the first aspect, the second aspect, or the implementations of the first aspect and the second aspect.

A seventh aspect of the embodiments of the present application provides a device-to-device D2D communication method, and the method includes: determining, by a second base station in a second network, that information used to configure a D2D communication timeslot in a first network changes, where the D2D communication timeslot is used for D2D communication between a first terminal in the first network and a second terminal in the second network, and the first network and the second network are different home networks; and sending, by the second base station, a notification to a first base station in the first network.

An eighth aspect of the embodiments of the present application provides a D2D communication method, and the method includes: receiving, by a first base station in a first network, a notification sent by a second base station in a second network, where the notification includes information used to configure a D2D communication timeslot in the first network, the D2D communication timeslot is used for D2D communication between a first terminal in the first network and a second terminal in the second network, and the first network and the second network are different home networks; and configuring, by the first base station, the D2D communication timeslot in the first network according to the notification.

According to the technical solution provided in this embodiment of the present application, when information used to configure a timeslot used for D2D communication between a terminal in a first network and a terminal in a second network changes in the second network, a base station in the second network is controlled to proactively notify a base station in the first network of the changed content, so as to control the base station in the first network to perform timeslot configuration. Compared with the prior art, the technical solution provided in this embodiment of the present application significantly reduces signaling overheads caused because a terminal frequently and proactively reports information about the second network.

In an implementation of the seventh aspect or the eighth aspect of the embodiments of the present application, the information used to configure the D2D communication timeslot includes a resource pool time domain location of the second network, or time domain calibration information, or a resource pool time domain location of the second network and time domain calibration information. When the resource pool time domain location of the second network changes, the notification includes the resource pool time domain location of the second network. Alternatively, when the time domain calibration information changes, the notification includes the time domain calibration information. Alternatively, when the resource pool time domain location of the second network and the time domain calibration information change, the notification includes the resource pool time domain location of the second network and the time domain calibration information.

In an implementation of the seventh aspect or the eighth aspect of the embodiments of the present application, the time domain calibration information includes a number of a subframe corresponding to sending of the notification or standard time information of a first subframe.

A ninth aspect of the embodiments of the present application provides a second base station in a second network, and the second base station includes: a processing unit, configured to determine that information used to configure a D2D communication timeslot in a first network changes, where the D2D communication timeslot is used for D2D communication between a first terminal in the first network and a second terminal in the second network, and the first network and the second network are different home networks; and a transceiver unit, configured to send a notification to a first base station in the first network.

A tenth aspect of the embodiments of the present application provides a first base station in a first network, and the first base station includes: a transceiver unit, configured to receive a notification sent by a second base station in a second network, where the notification includes information used to configure a D2D communication timeslot in the first network, the D2D communication timeslot is used for D2D communication between a first terminal in the first network and a second terminal in the second network, and the first network and the second network are different home networks; and a processing unit, configured to configure the D2D communication timeslot in the first network according to the notification.

According to the technical solution provided in this embodiment of the present application, when information used to configure a timeslot used for D2D communication between a first terminal in a first network and a second terminal in a second network changes in the second network, a base station in the second network proactively notifies a base station of the changed content, so as to control the base station in the first network to perform timeslot configuration. Compared with the prior art, the technical solution provided in this embodiment of the present application significantly reduces signaling overheads caused because a terminal frequently and proactively reports information about the second network.

The second base station provided in the ninth aspect of the embodiments of the present application and the first base station provided in the tenth aspect of the embodiments of the present application can implement the method in any implementation of the seventh aspect and the eighth aspect of the embodiments of the present application, and details are not described herein again.

An eleventh aspect of the embodiments of the present application further provides a communications system, and the communications system may include the foregoing first base station and the foregoing second base station.

A twelfth aspect of the embodiments of the present application further provides a computer program, which may be used to enable a computer to execute the method according to any one of the seventh aspect, the eighth aspect, or the implementations of the seventh aspect and the eighth aspect.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the specific technical solutions and objectives of the present application clearer, the following further clearly and describes the present application with reference to specific embodiments and accompanying drawings. Apparently, the described embodiments are some but not all of the embodiments of the present application. All other embodiments obtained by a person of ordinary skill in the art based on the embodiments of the present application without creative efforts shall fall within the protection scope of the present application.

D2D communication is a technology that supports direct data communication between terminals by using a dedicated air interface technology. In this case, a base station performs communication resource configuration, scheduling, coordination, and the like, so as to assist the direct data communication between the terminals. In an Internet of Vehicles system that uses a D2D communication technology, a vehicle may be used as a form of a terminal to implement direct data communication with another vehicle.

Figure 1:
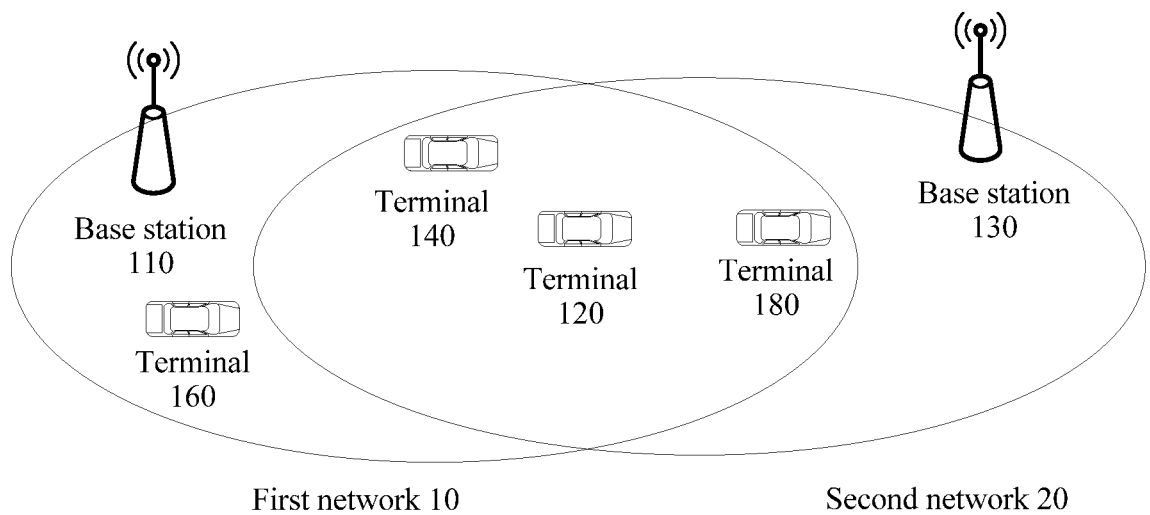
FIG. 1 is a schematic diagram of a network application scenario according to an embodiment of the present application.

FIG. 1 is a schematic diagram of a network application scenario according to an embodiment of the present application. This embodiment of the present application may be mainly applied to D2D communication, for example, may be applied to an Internet of Vehicles system that uses D2D communication, or may be applied to a cellular network that supports D2D communication.

As shown in FIG. 1, a first network 10 and a second network 20 exist in the application scenario. The first network 10 and the second network 20 are different home networks, that is, the first network 10 and the second network 20 are respectively maintained by two different carriers, and cannot learn of information related to D2D communication in each other. However, the information is crucial to mutual D2D communication between terminals that respectively belong to the two networks. For example, the information may be a resource pool time domain location and time domain calibration information that are used to perform D2D communication.

In the technical solution provided in this embodiment of the present application, the first network 10 and the second network 20 may support a same radio access technology (RAT). Certainly, the technical solution may also be applied to a scenario in which the first network 10 and the second network 20 support different RATs. This is not limited herein.

A base station 110 is a base station in the first network. A terminal 120 in coverage of the first network 10 and the second network 20 belongs to the first network. A base station 130 is a base station in the second network 20. The application architecture may further include a plurality of terminals. However, FIG. 1 shows only a terminal 140 and a terminal 160 that belong to the first network 10, and a terminal 180 that belongs to the second network 20. The terminal 140 is in the coverage of the first network 10 and the second network 20, and the terminal 160 is in coverage of the first network 10. The terminal 180 is in the coverage of the first network 10 and the second network 20.

Figure 3:
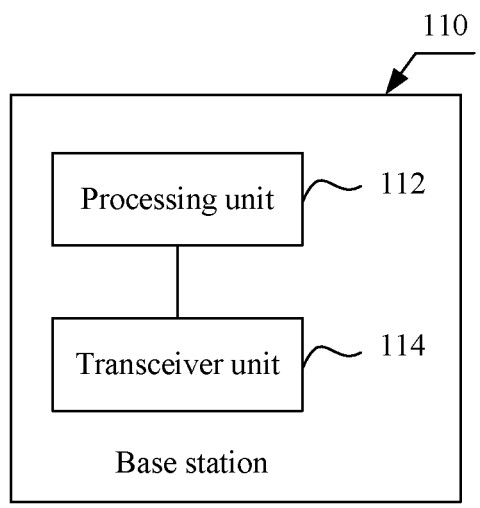
FIG. 3 is a schematic structural diagram of a base station according to an embodiment of the present application.
Figure 5:
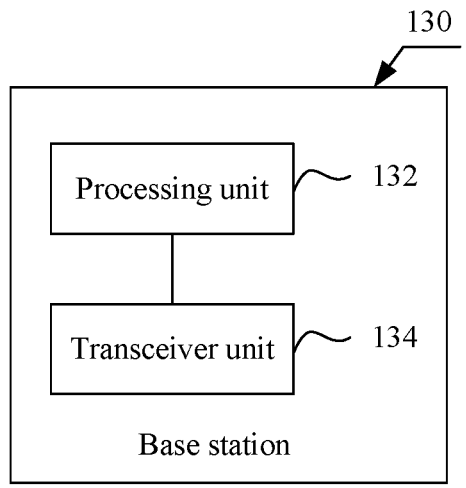
FIG. 5 is a schematic structural diagram of another base station according to an embodiment of the present application.

The base station 110 or the base station 130 may be a macro base station or a small cell. For example, in an LTE system, the base station 110 or the base station 130 may be an evolved NodeB (eNodeB), or may be a small cell such as a home eNodeB (HeNB), an access point (AP), a micro base station, or a picocell base station (pico base station). In the Universal Mobile Telecommunications System (UMTS), the base station 110 or the base station 130 may include a NodeB (Node B) and a radio network controller (RNC). In the Global System for Mobile Communications (GSM), the base station 110 or the base station 130 may include a base station controller (BSC), a base transceiver station (BTS), and the like. FIG. 3 shows a base station 110 according to an embodiment of the present application. The base station 110 may include a processing unit 112 and a transceiver unit 114. FIG. 5 shows a base station 130 according to an embodiment of the present application. The base station 130 may include a processing unit 132 and a transceiver unit 134.

Figure 4:
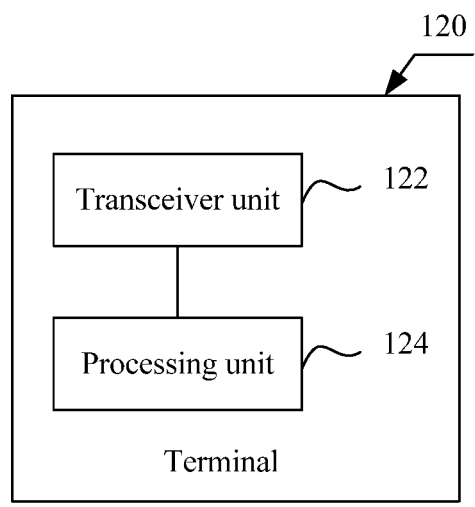
FIG. 4 is a schematic structural diagram of a terminal according to an embodiment of the present application.

The terminal 120 may be referred to as user equipment (UE), a mobile station, a subscriber unit, a cellular phone, a smartphone (smart phone), a wireless data card, a personal digital assistant (PDA) computer, a tablet computer, a wireless modem, a handheld device, a laptop computer, a cordless phone, a wireless local loop (WLL) station, or the like. Particularly, in the Internet of Vehicles, the terminal 120 may be a vehicle. FIG. 4 shows a terminal 120 according to an embodiment of the present application. The terminal 120 may include a transceiver unit 122 and a processing unit 124.

In this embodiment of the present application, the base station 110 includes the processing unit 112 and the transceiver unit 114, the terminal 120 includes the processing unit 124 and the transceiver unit 122, and the base station 130 includes the processing unit 132 and the transceiver unit 134. Therefore, an operation performed by the processing unit 112 or the transceiver unit 114 may be considered as an operation of the base station 110, an operation performed by the processing unit 124 or the transceiver unit 122 may be considered as an operation of the terminal 120, and an operation performed by the processing unit 132 or the transceiver unit 134 may be considered as an operation of the base station 130. In this embodiment of the present application, the processing unit 112 in the base station 110 may be implemented by a processor in the base station 110, the transceiver unit 114 may be implemented by a transceiver in the base station 110, the processing unit 124 in the terminal 120 may be implemented by a processor in the terminal 120, the transceiver unit 122 may be implemented by a transceiver in the terminal 120, the processing unit 132 in the base station 130 may be implemented by a processor in the base station 130, and the transceiver unit 134 may be implemented by a transceiver in the base station 130.

In this embodiment of the present application, for D2D communication, each home network possesses communication resources for operating a D2D service, and the communication resources for operating a D2D service may be divided into one or more resource pools. Each resource pool has a frequency domain location and a time domain location. Each resource pool may periodically appear in a time domain. In D2D communication, information is transmitted between terminals in different networks by using a resource pool. A subframe is a time unit of data transmission in a network, that is, the subframe describes data transmission in a dimension of time. Different home networks may not be aligned in the dimension of time. As a result, an offset in the time domain is generated between subframes with a same number in the different home networks. Information about the offset may be notified by using time domain calibration information, so as to implement alignment of the different home networks in the time domain.

To implement D2D communication between a terminal in the first network 10 and a terminal in the second network 20 that are shown in FIG. 1, the first network 10 at least needs to learn of a resource pool time domain location in the second network 20 for a resource pool location in the second network 20. The first network 10 further needs to learn of time domain calibration information. According to the resource pool time domain location in the second network 20 and the time domain calibration information, the base station in the first network 10 may configure a timeslot used for the D2D communication between the terminal in the first network 10 and the terminal in the second network 20. In the timeslot, the terminal in the first network 10 disconnects from the first network and connects to the second network 20, to send information in a resource pool of the second network 20 so that the terminal in the second network 20 obtains the information, or to receive information sent by the terminal in the second network 20 in a resource pool of the second network 20.

Figure 2:
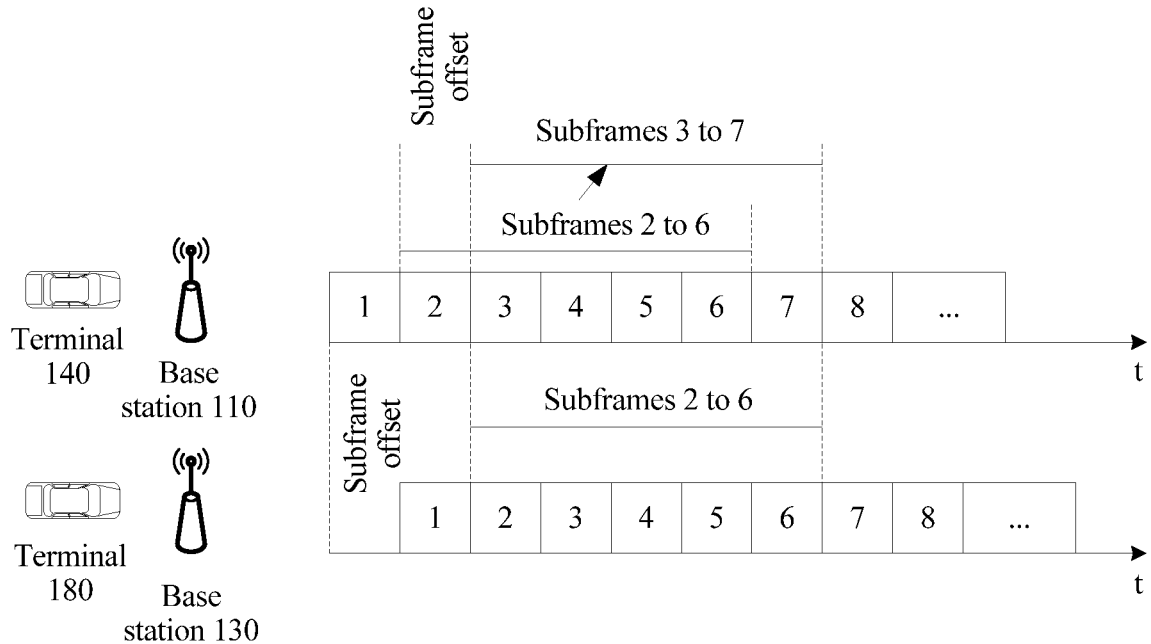
FIG. 2 is a schematic diagram of D2D communication according to an embodiment of the present application.

For example, referring to FIG. 2, the first network 10 and the second network 20 may be public land mobile networks (PLMN). A PLMN is a wireless communications system tending to be oriented towards, for example, a vehicle or a walking user on the land. Different PLMNs are usually maintained by different carriers, and therefore a lot of information cannot be mutually shared. The first network and the second network use communications systems of a same radio access technology RAT, for example, a Long Term Evolution (LTE) system.

As shown in FIG. 2, the terminal 140 that belongs to the first network 10 prepares to perform D2D communication with the terminal 180 in the second network 20. To configure a timeslot for the terminal 140 to implement the D2D communication with the terminal 180 in the second network 20, the base station 110 in the first network 10 not only needs to learn of a resource pool time domain location used by the second network 20, for example, subframes 2 to 6 in FIG. 2, but also needs to learn of time domain calibration information used to implement alignment of the first network 10 and the second network 20 in the time domain, for example, a subframe offset of the second network 20 relative to the first network 10, where the subframe offset is one subframe. In this way, after the base station 110 in the first network 10 configures the timeslot, the timeslot is aligned with a resource pool location of the second network 20 in the time domain. That is, the base station 110 in the first network 10 first finds subframes 2 to 6 in the first network 10, and then delays the subframes 2 to 6 by an offset time period according to the time domain calibration information, so that the configured timeslot is subframes 3 to 7. The terminal 140 may perform the D2D communication with the terminal 180 in the timeslot. For example, the terminal 140 may receive information sent by the terminal 180, or the terminal 140 sends information to the terminal 180. Certainly, the terminal 140 may also send a broadcast message to a terminal in the second network 20 in the timeslot. This is not limited herein.

In the prior art, a large quantity of terminals may exist in the first network 10. In addition, each time when sending information to the terminal in the second network 20 in a manner of D2D communication, all the terminals proactively report, to the first network 10, a location of a sending resource for the D2D communication in the second network 20 and a subframe offset of the second network 20 relative to the first network 10.

However, in practice, a resource pool location in which the terminal in the second network 20 performs D2D communication is probably fixed, and usually drifts slowly in a network subframe level. As a result, huge signaling overheads are caused. In addition, each time D2D communication needs to be performed, the large quantity of terminals first connect to the second network 20 to obtain a location of a sending resource for the D2D communication and a subframe offset of the second network 20 relative to the first network 10, and report the location of the sending resource and the subframe offset to the first network 10. As a result, a long D2D communication delay is caused. A method provided in an embodiment of the present application can resolve problems of huge signaling overheads and a communication delay in D2D communication.

Figure 6:
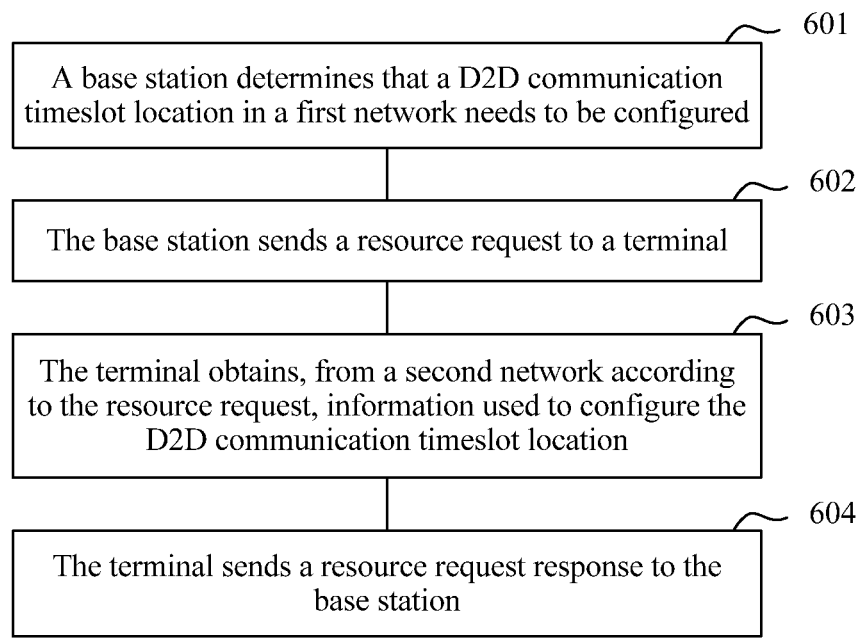
FIG. 6 is a flowchart of a D2D communication method according to an embodiment of the present application.

FIG. 6 is a flowchart of a D2D communication method according to an embodiment of the present application. The method may be applied to the network application scenario shown in FIG. 1, and is implemented by means of collaboration between the base station 110 in the application embodiment in FIG. 3 and the terminal 120 in the application embodiment in FIG. 4. The method includes the following steps.

S601. The base station 110 determines that a D2D communication timeslot in a first network 10 needs to be configured, where the D2D communication timeslot is used for D2D communication between a first terminal in the first network 10 and a second terminal in a second network 20.

When the first terminal in the first network 10 needs to perform D2D communication with the second terminal in the second network 20, to make the first terminal in the first network 10 accurately find a resource pool location of the second network 20 and transmit information to the second terminal in the second network 20, the base station 110 first needs to configure a D2D communication timeslot for the first terminal in the first network 10. In the D2D communication timeslot, the first terminal in the first network 10 may connect to the second network 20, to send information in a resource pool of the second network 20 so that the second terminal in the second network 20 obtains the information, or to receive information sent by the second terminal in the second network 20 in a resource pool of the second network 20. Optionally, the D2D communication timeslot is a gap location.

The first terminal may be the terminal 140 or the terminal 120 in the network application scenario in FIG. 1. The second terminal may be the terminal 180 in the network application scenario in FIG. 1. In this case, the terminal 140 and the terminal 180 need to support D2D communication.

To configure the D2D communication timeslot in the first network 10, the base station 110 needs to obtain information used to configure the D2D communication timeslot.

When the first network 10 needs to configure the D2D communication timeslot, the first network 10 may have learned of time domain calibration information, but does not obtain a resource pool time domain location of the second network 20; or the first network 10 has learned of a resource pool time domain location of the second network 20, but does not obtain time domain calibration information; or the first network 10 neither obtains a resource pool time domain location of the second network 20, nor obtains time domain calibration information.

Therefore, the information used to configure the D2D communication timeslot may include the resource pool time domain location of the second network 20, or the time domain calibration information of the second network 20, or the resource pool time domain location of the second network 20 and the time domain calibration information of the second network 20. After the foregoing information is obtained, the base station 110 configures the D2D communication timeslot according to the resource pool time domain location and the time domain calibration information of the second network 20, so that the D2D communication timeslot is aligned with the resource pool location of the second network 20 in a time domain.

The resource pool time domain location of the second network 20 is a description of a resource pool location in a dimension of time, may include a specific time at which a resource pool of the second network 20 appears, or may certainly include a period in which the resource pool of the second network 20 appears.

The time domain calibration information may be standard time information of a subframe of the second network 20, for example, a number of a subframe of the second network 20 and standard time corresponding to the subframe. The standard time may be Greenwich Mean Time, or reference time on which the first network 10 and the second network 20 agree. Alternatively, the time domain calibration information may be a relative subframe location of the second network 20 relative to the first network 10, that is, may be a subframe offset of the second network 20 relative to the first network 10. The offset may be in a unit of a subframe quantity. For example, in an LTE system, the subframe quantity may range from 0 to 2047. In addition, the offset may be a forward offset or a backward offset. When the offset is the forward offset, it indicates that the base station 110 may delay the D2D communication timeslot by a length of the offset in the time domain when configuring the D2D communication timeslot; or when the offset is the backward offset, it indicates that the base station 110 may advance the D2D communication timeslot by a length of the offset in the time domain when configuring the D2D communication timeslot.

A specific example is used herein to describe a case in which the time domain calibration information is standard time information of a subframe of the second network 20. The terminal 120 may obtain a subframe number 7 in the second network 20 and corresponding Greenwich Mean Time, for example, 03:10:25:12, and then report the subframe number 7 and the corresponding Greenwich Mean Time to the base station 110. With reference to Greenwich Mean Time 03:10:25:24 corresponding to a subframe number 7 in the first network 10, the base station 110 can obtain a 12-millisecond backward deviation in the time domain in the two networks by means of calculation.

The base station 110 may first determine whether the D2D communication timeslot needs to be configured. If the first network 10 has configured a timeslot used for D2D communication with the second network 20, the information that is used to configure the D2D communication timeslot and that is of the second network 20 may not change in a short time. Therefore, the base station 110 does not need to reconfigure an idle timeslot, that is, does not need to obtain the information used to configure the D2D communication timeslot. Only when determining that a timeslot in the first network 10 needs to be configured, the base station 110 needs to trigger the terminal 120 to report the information used to configure the D2D communication timeslot. Therefore, the base station 110 determines whether the D2D communication timeslot needs to be configured, so that a prior-art problem that a terminal frequently reports information used to configure a D2D communication timeslot can be resolved.

For example, the base station 110 may determine, by using the following two scenarios, that the D2D communication timeslot in the first network 10 needs to be configured.

(1) The Base Station 110 Sets a First Timer.

The base station 110 triggers the first timer to start timing. When the first timer expires, the base station 110 determines that the D2D communication timeslot in the first network 10 needs to be configured.

The base station 110 sets a dedicated timer, controls the timer to start timing, and monitors the timing. When the timer expires, the base station 110 determines that the D2D communication timeslot in the first network 10 needs to be configured. A time of the timer may be set at will, for example, may be set according to a previous time interval at which the resource pool location of the second network 20 changes or a subframe of the second network 20 drifts. This is not limited herein.

(2) The Base Station 110 Receives a Notification from the Second Network 20.

The notification from the second network 20 is used to instruct the base station to configure the D2D communication timeslot in the first network.

The notification from the second network 20 may indicate, by using a bit, that the resource pool time domain location of the second network 20 and the time domain calibration information change. For example, the notification may indicate, by respectively using one bit, that the resource pool time domain location of the second network 20 changes and that the time domain calibration information of the second network 20 changes.

The notification includes information indicating that the resource pool time domain location of the second network changes, and the information used to configure the D2D communication timeslot includes the resource pool time domain location of the second network 20. Alternatively, the notification includes information indicating that the time domain calibration information changes, and the information used to configure the D2D communication timeslot includes the time domain calibration information. Alternatively, the notification includes information indicating that the resource pool time domain location of the second network 20 changes and information indicating that the time domain calibration information changes, and the information used to configure the D2D communication timeslot includes the resource pool time domain location of the second network 20 and the time domain calibration information.

That is, the base station 110 may determine, by using a proactive notification provided by the second network 20 when the resource pool time domain location and the time domain calibration information of the second network 20 change, that the D2D communication timeslot needs to be configured. The proactive notification may be performed by a base station 130 in the second network 20. The notification may be carried in an inter-PLMN resource modification indication message. The message may be an X2 application layer message in an LTE system, a message sent in a data link established between the base station 110 in the first network 10 and the base station 130 in the second network 20, a radio information message (RIM) between the base station 110 in the first network 10 and the base station 130 in the second network 20, or a message forwarded by a base station 130 in the second network 20 to a base station 110 in the first network 10 by using an operation administration and maintenance (OAM) device.

Certainly, the foregoing two scenarios are merely used as an example of the technical solution in this embodiment of the present application and not construed as a limitation. For example, based on a D2D communication request that is initiated by a terminal to the base station 110 and that includes information used to request the base station 110 to configure the D2D communication timeslot, the base station 110 may determine that the D2D communication timeslot needs to be configured. In conclusion, another equivalent variation that may be implemented by a person skilled in the art is included.

S602. The base station 110 sends a resource request to the terminal 120, where the resource request is used to instruct the terminal 120 to report, to the base station 110, information used to configure the D2D communication timeslot.

The base station 110 performs S602 after determining that the D2D communication timeslot needs to be configured. The base station 110 sends the resource request to the terminal 120, and expects the terminal 120 to obtain, from the second network 20, the information used to configure the D2D communication timeslot.

When performing S602, the base station 110 first needs to determine an object, the terminal 120, to which the resource request is sent. It should be noted that in addition to belonging to the first network 10 and supporting a function of D2D communication, the terminal 120 may further need to obtain the information used to configure the D2D communication timeslot, that is, can obtain information from or perform feature measurement in the second network 20.

For example, the base station 110 may determine, in the following manners, that the terminal 120 can obtain the information used to configure the D2D communication timeslot.

If the base station 110 learns that the terminal 120 has reported information related to a D2D communication feature before S602, it is proved that the terminal 120 can support D2D communication. For example, before S602, the base station 110 has received a D2D communication request sent by the terminal 120. Alternatively, before S602, the base station 110 has received D2D communication capability indication information sent by the terminal 120. The D2D communication capability indication information is used to indicate that the terminal 120 can perform D2D communication. For example, in an LTE system, the D2D communication capability indication information is sidelink UE information (side link UE information).

On the other hand, a manner in which the base station 110 selects the object, the terminal 120, to which the resource request is sent may be: the base station 110 selects any terminal in an activated state (a state in which the terminal can be controlled by the base station 110) as the terminal 120; or after determining that the D2D communication timeslot needs to be configured, the base station 110 selects a detected terminal that first initiates a D2D communication request as the terminal 120; or if there is no terminal in a current control area of the base station, after determining that the D2D communication timeslot needs to be configured, the base station 110 selects a detected terminal that first enters the control area as the terminal 120.

When selecting the object, the terminal 120, to which the resource request is sent, the base station 110 finds multiple terminals that can be referred to as the terminal 120. Optionally, the base station 110 preferentially selects a terminal that previously belongs to the second network 20, that is, selects a terminal moving from coverage of the second network 20 as the terminal 120. The base station 110 can learn, by using a handover procedure or the like, that the terminal previously belongs to the second network 20.

Optionally, the resource request may be sent in a form of an inter-PLMN resource request message.

Optionally, the resource request may include the following information:

an identity of the second network 20, where specifically, the identity of the second network 20 may be a PLMN identity (PLMN ID) that represents the second network 20;

a cell identity in the second network 20, where specifically, the cell identity in the second network 20 may be an identity of at least one cell, or a cell identity list when there are multiple cells;

a frequency of the second network 20, where the frequency of the second network 20 helps the terminal 120 quickly synchronize with the second network 20 and read the information used to configure the D2D communication timeslot and requested by the base station 110;

an information obtaining timeslot, where the information obtaining timeslot is used by the terminal 120 to obtain, from the second network 20, the information used to configure the D2D communication timeslot; where the terminal 120 that belongs to the first network 10 needs to obtain, from the second network 20 according to the resource request of the base station 110, the information used to configure the D2D communication timeslot; the base station 110 may first configure an information obtaining timeslot for the terminal 120; in the information obtaining timeslot, the terminal 120 temporarily disconnects from the first network 10, accesses the second network 20, and obtains, from the second network 20, the information used to configure the D2D communication timeslot; for example, the terminal 120 receives the information used to configure the D2D communication timeslot and sent by the base station 130 in a broadcast manner or a dedicated signaling manner; the resource request proactively sent by the base station 110 to the terminal 120 includes the information obtaining timeslot, so that a delay in obtaining, by the terminal 120, the information used to configure the D2D communication timeslot may be greatly reduced;

information used to instruct to report the resource pool time domain location of the second network 20, where specifically, one bit may be used to indicate whether the resource pool time domain location of the second network 20 needs to be reported; and information used to instruct to report the time domain calibration information of the second network 20, where specifically, one bit may be used to indicate whether the time domain calibration information needs to be reported.

Certainly, the resource request may also include information used to instruct to report a resource pool frequency domain location of the second network 20 for subsequent use in a D2D communication process. This is not limited herein.

As an alternative, after performing S602, the base station may set a second timer to determine whether the terminal 120 responds to the resource request. If the base station 110 receives no response from the terminal 120 after the second timer expires, the base station 110 may resend a resource request to the terminal 120, or may reselect a terminal that meets the foregoing conditions and send a resource request to the reselected terminal.

A processing unit 112 of the base station 110 is configured to determine that the D2D communication timeslot in the first network 10 needs to be configured, where the D2D communication timeslot is used for the D2D communication between the first terminal in the first network 10 and the second terminal in the second network 20.

A transceiver unit 114 of the base station 110 is configured to send the resource request to the terminal 120, where the resource request is used to instruct the terminal 120 to report, to the base station 110, the information used to configure the D2D communication timeslot.

Optionally, the processing unit 112 of the base station 110 is further configured to set a first timer, trigger the first timer to start timing, and determine that the first timer expires.

Optionally, the transceiver unit 114 of the base station 110 is further configured to receive a notification message from the second network 20.

Optionally, the processing unit 112 of the base station 110 is further configured to determine that the terminal can obtain the information used to configure the D2D communication timeslot.

Optionally, a transceiver unit 122 of the terminal 120 is configured to receive the resource request sent by the base station 110.

S603. The terminal 120 obtains, from the second network 20 according to the resource request, the information used to configure the D2D communication timeslot.

After receiving the resource request sent by the base station 110, the terminal 120 obtains, from the second network 20 according to information in the resource request, the information used to configure the D2D communication timeslot.

Optionally, the information used to configure the D2D communication timeslot includes the resource pool time domain location of the second network 20, or time domain calibration information, or the resource pool time domain location of the second network 20 and the time domain calibration information.

A manner in which the terminal 120 obtains, from the second network 20, the information used to configure the D2D communication timeslot may be reading, from the second network 20, system broadcast signaling sent by the base station 130 in the second network 20, and the system broadcast signaling in an LTE system is a system information block (SIB) 18 used for D2D communication information broadcasting. Alternatively, a manner in which the terminal 120 obtains, from the second network 20, the information used to configure the D2D communication timeslot may be receiving, by using dedicated signaling between the terminal 120 and the base station 130 in the second network 20, the information used to configure the D2D communication timeslot.

Optionally, if the time domain calibration information needs to be obtained, the terminal 120 may first obtain standard time information of a subframe of the second network 20, for example, a number of a subframe of the second network 20 and standard time corresponding to the subframe. The standard time may be Greenwich Mean Time, or reference time on which the first network 10 and the second network 20 agree. Alternatively, the time domain calibration information may be a relative subframe location of the second network 20 relative to the first network 10, that is, may be a subframe offset of the second network 20 relative to the first network 10. The offset may be in a unit of a subframe quantity. For example, in an LTE system, the subframe quantity may range from 0 to 2047. In addition, the offset may be a forward offset or a backward offset.

Optionally, when the time domain calibration information is the subframe offset of the second network 20 relative to the first network 10, for the terminal 120, the terminal 120 may initially obtain standard time information of a subframe from the second network 20, and then convert, according to standard time information of a corresponding subframe of the first network 10, the standard time information into the subframe offset of the second network 20 relative to the first network 10 by means of calculation. (For a specific algorithm, refer to an example of a case, in which the time domain calibration information is an absolute subframe location of the second network 20, used to describe the time domain calibration information in S601, and an action herein is performed by the terminal 120 instead of the base station 110). In this way, when performing subsequent S604, the terminal 120 may send the subframe offset to the base station 110 as the time domain calibration information.

A processing unit 124 of the terminal 120 may be configured to obtain, from the second network 20 according to the resource request, the information used to configure the D2D communication timeslot.

S604. The terminal 120 sends a resource request response to the base station 110, where the resource request response includes the information used to configure the D2D communication timeslot.

The terminal 120 sends the information used to configure the D2D communication timeslot and obtained in S603 to the base station 110 by using the resource request response. Optionally, the resource request response may be sent in a form of an inter-PLMN resource response.

Optionally, if the base station determines, by means of timing by the first timer in S601, that the D2D communication timeslot needs to be configured, the base station 110 may reset the first timer after receiving the resource request response sent by the terminal 120.

The transceiver unit 122 of the terminal 120 is configured to send the resource request response to the base station 110.

The transceiver unit 114 of the base station 110 is configured to receive the resource request response sent by the terminal 120.

Optionally, the processing unit 112 of the base station 110 is configured to reset the first timer.

After obtaining the information used to configure the D2D communication timeslot in the resource request response, the base station 110 may configure the D2D communication timeslot for the first terminal in the first network 10, to implement the D2D communication between the first terminal in the first network 10 and the second terminal in the second network 20.

The base station 110 may obtain, according to the previously obtained resource pool time domain location of the second network 20, the time domain calibration information by means of reporting by the terminal 120. Alternatively, the base station 110 may obtain, according to the previously obtained time domain calibration information of the second network 20, the resource pool time domain location by means of reporting by the terminal 120. Alternatively, the base station previously does not learn of the information used to configure the D2D communication timeslot, and obtains the time domain calibration information and the resource pool time domain location by means of reporting by the terminal 120. In conclusion, before configuring the D2D communication timeslot in the first network 10, the base station 110 has obtained the time domain calibration information and the resource pool time domain location. Afterward, the base station 110 first finds a time domain location that is in the first network 10 and corresponding to the resource pool time domain location in the second network 20. For example, if the resource pool time domain location in the second network 20 is subframes 2 to 6 in the second network 20, the base station 110 first finds, in the first network 10, subframes 2 to 6 in the first network 10; then according to the time domain calibration information, for example, when the time domain calibration information is an absolute subframe location, the base station may obtain an offset of the second network 20 relative to the first network 10 by means of calculation in the manner mentioned in S601; or the base station may directly obtain an offset of the second network 20 relative to the first network 10 when the time domain calibration information is a relative subframe location, that is, a subframe offset of the second network 20 relative to the first network 10; the base station 110 adds a forward offset to or subtracts a backward offset from the subframes 2 to 6 in the second network; and finally, an obtained time domain location is the D2D communication timeslot that needs to be configured.

According to the technical solution provided in this embodiment of the present application, when determining that a timeslot needs to be configured for D2D communication between a terminal in a local network and a terminal in another network, a base station is triggered to send a resource request to a specific terminal to obtain information used to configure the timeslot in the local network. The local network and the another network are different home networks. Compared with the prior art, the technical solution provided in this embodiment of the present application significantly reduces signaling overheads caused because a terminal frequently reports information related to the another network.

According to the foregoing application embodiment, the terminal 120 obtains, from the second network 20, the information used to configure the D2D communication timeslot. In practice, the base station 130 in the second network 20 may also proactively notify a base station in the first network 10 of information used to configure the D2D communication timeslot.

Figure 7:
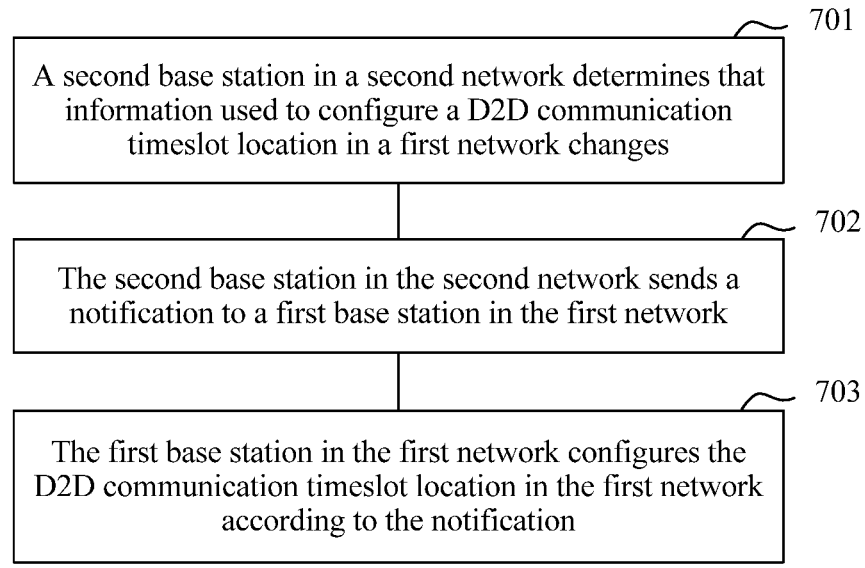
FIG. 7 is a flowchart of another D2D communication method according to an embodiment of the present application.

FIG. 7 is a flowchart of another D2D communication method according to an embodiment of the present application. The method may be applied to the foregoing application architecture shown in FIG. 2, and is implemented by means of collaboration between the base station 110 in the application embodiment in FIG. 3 and the base station 130 in the application embodiment in FIG. 5. The method includes the following steps:

S701. The base station 130 determines that information, in a second network 20, used to configure a D2D communication timeslot in a first network 10 changes, where the D2D communication timeslot is used for D2D communication between a first terminal in the first network 10 and a second terminal in the second network 20.

S702. The base station 130 sends a notification to the base station 110.

S703. The base station 110 configures the D2D communication timeslot in the first network 10 according to the notification.

The base station 110 and the base station 130 may determine, by means of pre-configuration or the like, that the D2D communication between the first terminal in the first network 10 and the second terminal in the second network 20 needs to be implemented. In addition, when the base station 130 finds, by using an internal mechanism, that the information used to configure the D2D communication timeslot in the first network 10 changes, the base station 130 is triggered to perform S702, so that the base station 110 configures a timeslot used by the first terminal in the first network 10 to implement the D2D communication with the second terminal in the second network 20.

Certainly, as an alternative, the notification in S702 is not necessarily sent to the base station 110 only when the base station 130 determines that the information used to configure the D2D communication timeslot in the first network 10 changes. The base station 130 may also set a third timer in the second network 20. When the third timer expires, the base station 130 performs S702 regardless of whether the information, in the second network 20, used to configure the D2D communication timeslot in the first network 10 changes.

The information used to configure the D2D communication timeslot in the first network 10 includes a resource pool time domain location of the second network, or time domain calibration information, or a resource pool time domain location of the second network and the time domain calibration information.

Optionally, when the resource pool time domain location of the second network 20 changes, the notification includes the resource pool time domain location of the second network 20; when the time domain calibration information changes, the notification includes the time domain calibration information; or when the resource pool time domain location of the second network 20 and the time domain calibration information change, the notification includes the resource pool time domain location of the second network 20 and the time domain calibration information.

That is, the base station 130 directly notifies the base station 110 of at least one of the resource pool time domain location of the second network 20 or the time domain calibration information.

The base station 110 may configure a correct D2D communication timeslot according to information in the received notification, so as to implement the D2D communication between the first terminal in the first network 10 and the second terminal in the second network 20.

The resource pool time domain location of the second network 20 is a description of a resource pool location in a dimension of time, may include a specific time at which a resource pool of the second network 20 appears, or may certainly include a period in which the resource pool of the second network 20 appears.

As an alternative, the base station 130 may further notify the base station 110 of a resource pool frequency domain location of the second network 20, so that information about the resource pool frequency domain location is used in subsequent D2D communication.

Optionally, the time domain calibration information of the second network 20 may be standard time information of a subframe corresponding to sending of the notification, for example, a number of the subframe corresponding to the sending of the notification; or may be standard time information of a first subframe, for example, a number of the first subframe and standard time of the first subframe. The standard time may be Greenwich Mean Time, or reference time on which the first network 10 and the second network 20 agree.

A processing unit 132 of the base station 130 is configured to determine that the information, in the second network 20, used to configure the D2D communication timeslot in the first network 10 changes, and the D2D communication timeslot is used for the D2D communication between the first terminal in the first network 10 and the second terminal in the second network 20. A transceiver unit 134 of the base station 130 is configured to send the notification to the base station 110.

A transceiver unit 114 of the base station 110 is configured to receive the notification sent by the base station 130. A processing unit 112 of the base station 110 is configured to configure the D2D communication timeslot in the first network 10 according to the notification.

According to the technical solution provided in this embodiment of the present application, when information used to configure a timeslot used for D2D communication between a terminal in a first network 10 and a terminal in a second network 20 changes in the second network 20, a base station in the second network 20 is controlled to proactively notify a base station of the changed content, so as to control the base station in the first network 10 to perform timeslot configuration. Compared with the prior art, the technical solution provided in this embodiment of the present application significantly reduces signaling overheads caused because a terminal frequently and proactively reports information about the second network 20.

It should be noted that D2D communication between a first terminal and a second terminal in this embodiment of the present application may be unicast D2D communication or broadcast D2D communication in nature.

Figure 8:
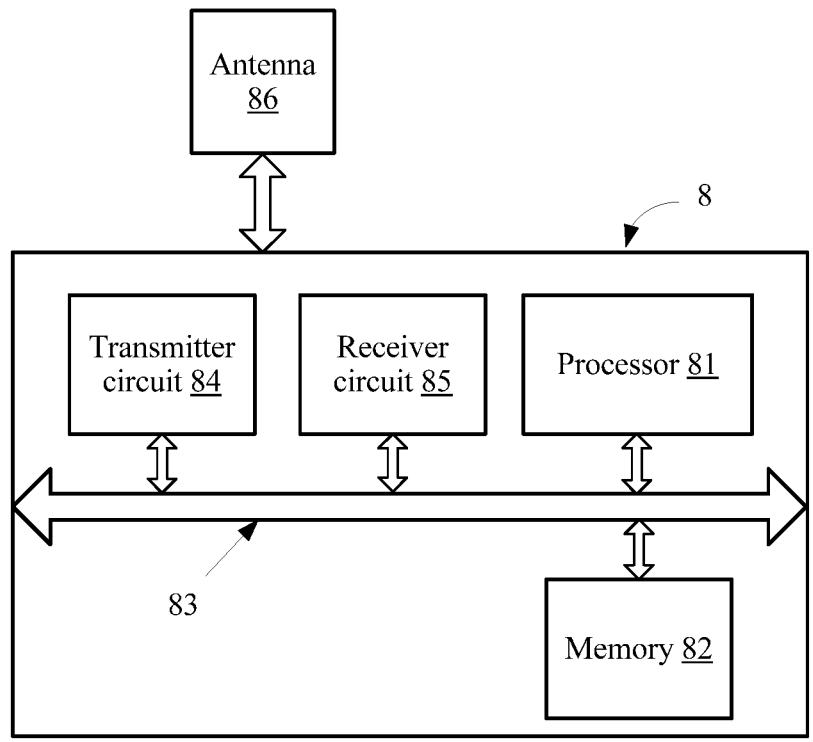
FIG. 8 is a communications apparatus according to an embodiment of the present application.

FIG. 8 shows a communications apparatus 8 according to an embodiment of the present application. The communications apparatus 8 includes a processor 81 and a memory 82. The processor 81 and the memory 82 are connected by using a bus system 83. The communications apparatus 8 may be the base station 110 in the embodiment of the present application, or may be the terminal 120 in the embodiment of the present application, or may be the base station 130 in the embodiment of the present application.

When the communications apparatus 8 is the base station 110, the memory 82 is configured to store an instruction that enables the processor 81 to execute all methods performed by the base station 110 in FIG. 6 and FIG. 7.

When the communications apparatus 8 is the terminal 120, the memory 82 is configured to store an instruction that enables the processor 81 to execute all methods performed by the terminal 120 in FIG. 6 and FIG. 7.

When the communications apparatus 8 is the base station 130, the memory 82 is configured to store an instruction that enables the processor 81 to execute all methods performed by the base station 130 in FIG. 6 and FIG. 7.

In addition, the communications apparatus 8 may further include a transmitter circuit 84, a receiver circuit 85, an antenna 86, and the like. The processor 81 controls an operation of the communications apparatus 8. The processor 81 may also be referred to as a CPU (central processing unit). The memory 82 may include a read-only memory and a random access memory, and provide an instruction and data to the processor 81. A part of the memory 82 may further include a nonvolatile random access memory (NVRAM). In a specific application, the transmitter circuit 84 and the receiver circuit 85 may be coupled to the antenna 86. Components of the communications apparatus 8 are coupled together by using the bus system 83. In addition to a data bus, the bus system 83 may further include a power bus, a control bus, a status signal bus, and the like. However, for clarity of description, various buses are marked as the bus system 83 in the figure.

The methods disclosed in the foregoing embodiments of the present application may be applied to the processor 81, or implemented by the processor 81. The processor 81 may be an integrated circuit chip, and has a signal processing capability. In an implementation process, steps of the foregoing methods may be completed by using an integrated logic circuit of hardware in the processor 81 or an instruction in a form of software. The foregoing processor 81 may be a general purpose processor, a digital signal processor (DSP), an application-specific integrated circuit (ASIC), a field-programmable gate array (FPGA) or another programmable logic component, a discrete gate or a transistor logic device, or a discrete hardware component.

A person skilled in the art may further understand that various illustrative logical blocks and steps that are listed in the embodiments of the present application may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person skilled in the art may use various methods to implement the described functions for each particular application, but it should not be understood that the implementation goes beyond the protection scope of the embodiments of present application.

The various illustrative logical blocks, modules, and circuits described in the embodiments of the present application may implement or operate the described functions by using a general purpose processing unit, a digital signal processing unit, an application-specific integrated circuit (ASIC), a field programmable gate array (FPGA) or another programmable logical apparatus, a discrete gate or a transistor logic device, a discrete hardware component, or a design of any combination thereof. The general purpose processing unit may be a microprocessing unit. Optionally, the general purpose processing unit may be any traditional processing unit, controller, microcontroller, or state machine. The processing unit may be implemented by a combination of computing apparatuses, such as a digital signal processing unit and a microprocessing unit, multiple microprocessing units, one or more microprocessing units with a digital signal processing unit core, or any other similar configuration.

Steps of the methods or algorithms described in the embodiments of the present application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal. Alternatively, the processing unit and the storage medium may be arranged in different components of the user terminal.

In one or more examples of designs, the functions described in the embodiments of the present application may be implemented by using hardware, software, firmware, or any combination thereof. If the present application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. A disc (disc) and a disk (disk) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present application, technologies in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and designs but may also be extended to a maximum scope that is consistent with the principles and disclosed new features of the present application.

What is claimed is:

1. A device-to-device (D2D) communication method, executed by a third terminal served by a first base station in a first public land mobile network (PLMN), wherein the method comprises:
   receiving, by the third terminal a resource request from the first base station, wherein the resource request is sent in response to a communications slot in a first network needing to be configured, and wherein the resource request instructs the third terminal to report, to the first base station, time and frequency domain location of D2D communication resource pool in a second PLMN different from the first PLMN, wherein the time and frequency domain location of the D2D communication resource pool in the second PLMN corresponds to communication resource for D2D data transmitted between a first terminal served by the first base station and a second terminal served by a second base station in the second PLMN and the resource request further instructs the third terminal to report time domain calibration information;
   obtaining from the second base station, by the third terminal according to the resource request, the time and frequency domain location of the D2D communication resource pool in the second PLMN and the time domain calibration information; and
   sending, by the third terminal, a resource request response to the first base station, wherein the resource request response comprises the time and frequency domain location of the D2D communication resource pool in the second PLMN and comprises the time domain calibration information.

2. The method according to claim 1, wherein the resource request comprises frequency information of the second PLMN.

3. The method according to claim 1, wherein the obtaining from the second base station, by the third terminal according to the resource request, the time and frequency domain location of the D2D communication resource pool in the second PLMN and the time domain calibration information comprises:
   obtaining from the second PLMN, by the third terminal according to the resource request by reading the time and frequency domain location of the D2D communication resource pool in the second PLMN and the time domain calibration information carried in system broadcast signaling from the second base station.

4. A third terminal device served by a first base station in a first public land mobile network (PLMN), wherein the device comprises:
   a non-transitory computer-readable storage medium; and
   a processor coupled to the non-transitory computer-readable storage medium, wherein the non-transitory computer-readable storage medium stores programming instructions for execution by the processor and the programming instructions instruct the processor to:
      utilize a transceiver to receive a resource request from the first base station, wherein the resource request is sent in response to a communications slot in a first network needing to be configured, and wherein the resource request instructs the third terminal device to report, to the first base station, time and frequency domain location of D2D communication resource pool in a second PLMN different from the first PLMN, wherein the time and frequency domain location of the D2D communication resource pool in the second PLMN corresponds to communication resource for D2D data transmitted between a first terminal served by the first base station and a second terminal served by a second base station in the second PLMN and the resource request further instructs the third terminal to report time domain calibration information; and
      utilize the transceiver to obtain, from the second base station according to the resource request, the time and frequency domain location of the D2D communication resource pool in the second PLMN and the time domain calibration information;
      utilize the transceiver to send a resource request response to the first base station, wherein the resource request response comprises the time and frequency domain location of the D2D communication resource pool in the second PLMN and comprises the time domain calibration information.

5. The third terminal device according to claim 4, wherein the resource request comprises frequency information of the second PLMN.

6. The third terminal device according to claim 4, wherein the instructions that instruct the processor to utilize the transceiver to obtain, from the second base station according to the resource request, the time and frequency domain location of the D2D communication resource pool in the second PLMN and the time domain calibration information, comprises instructions that instruct the processor to:
   utilize the transceiver to obtain, from the second PLMN according to the resource request by reading the time and frequency domain location of D2D communication resource pool and the time domain calibration information in the second PLMN carried in system broadcast signaling from the second base station in the second PLMN.

7. The method according to claim 1, wherein the time domain calibration information is standard time information of the second PLMN, or a time offset of the second PLMN relative to the first PLMN.

8. The third terminal device according to claim 4, wherein the time domain calibration information is standard time information of the second PLMN, or a time offset of the second PLMN relative to the first PLMN.

* * * * *